INVENTORS:
JOHN P. COSTAS,
LAWRENCE C. WIDMANN,
BY Delbert P. Warner
THEIR ATTORNEY.

INVENTORS:
JOHN P. COSTAS,
LAWRENCE C. WIDMANN,
BY Delbert P. Warner
THEIR ATTORNEY.

INVENTORS:
JOHN P. COSTAS,
LAWRENCE C. WIDMANN,
BY Delbert P. Warner
THEIR ATTORNEY.

DATA TRANSMISSION SYSTEM

Filed Jan. 9, 1962 4 Sheets-Sheet 4

INVENTORS:
JOHN P. COSTAS,
LAWRENCE C. WIDMANN,
BY Delbert P. Warner
THEIR ATTORNEY.

3,337,803

DATA TRANSMISSION SYSTEM

John P. Costas, Fayetteville, and Lawrence C. Widmann, Kirkville, N.Y., assignors to General Electric Company, a corporation of New York Filed Jan. 9, 1962, Ser. No. 165,472
19 Claims. (Cl. 325—30)

This invention pertains to electronic wave transmission systems and in particular it relates to a system for generating, transmitting and receiving a very broad band signal which may be used to provide secure transmissions or may be used to perform other functions making use of the multi-paths which occur with the transmission of electro-magnetic energy at certain frequency ranges.

The prior art includes military communication equipment and commercial equipment which is designed to operate at very narrow bandwidths with requirements which are hard to meet, even when no interference is present. If interference or jamming is encountered, such systems frequently may be paralyzed with the attendant breakdown of elaborate and vital communications systems. These prior art devices have been built with the limitations of available space in the electro-magnetic spectrum in mind and as a result have become systems with ever narrower transmission bandwidths. One difficulty with this approach is that a reduction in bandwidth for a given data rate results in an increase in susceptibility to interference or jamming. Another difficulty is that it is becoming increasingly easier to locate narrow bands of concentrated power by use of modern ferreting systems. Furthermore, once the narrow bands are located, jamming signals of the same frequency are easy to generate and may be much more cheaply generated than the original signal, since the jammer signal transmitted need not be held to such close frequency tolerances as the original signal. Once the jamming equipment is operating at the signal transmitter frequency, it become simply a battle involving relative distances from the transmitters to the receivers and the relative amounts of power which are radiated by the signal transmitter and the jamming transmitter. This is a battle which the signal transmitter cannot win unless it is much nearer to the receiver than is the jammer or has overwhelming power available to it.

A solution to these problems lies in increasing transmission bandwidths instead of decreasing them. Known prior broadband equipment employing correlation and filtering techniques transmits signals which are hard to detect as signal transmissions at all, are very hard to jam because of their great bandwidth and the ways in which they vary, and which offer an ideal method by which to hide messages. Unfortunately these prior art broadband systems require extremely elaborate equipment, so much equipment that they are impractical in most military environments to say nothing of commercial environments.

It is, therefore a primary object of this invention to provide improved means for using broad band transmision systems.

It is another object of this invention to provide for improved transmission of information between communication points in the presence of heavy jamming signals.

It is still another object of this invention to provide improved means for transmitting a signal in such a way as to conceal the fact that transmission is taking place.

It is yet another object of this invention to provide for the study of the multi-path phenomena encountered in the transmission of broadband signals.

It is a further object of this invention to provide for advantageously using multi-path phenomena in the transmission and reception of broadband signals.

Briefly stated, in accordance with one aspect of the invention a pulse is supplied to a special network which provides an output consisting of a train of pulses having a duration much greater than that of the exciting pulse. The special network will, in a preferred embodiment, comprise a 500 μsec. delay line having 50 tap points coupled through a plurality of polarity switches which may be set to transmit signals of either positive or negative polarity in accordance with the selections of a sequence programmer. The outputs of the polarity switches are then combined to form a long train of coded pulses which looks like noise, but is made up of a plurality of contiguous short pulses of mixed positive and negative polarity. This long train of pulses is then fed to another polarity switch which is controlled by binary input data either to continue the transmission of the pulse train with the same polarity which it has been transmitting to indicate "mark" or to shift the polarity of the train of pulses by 180° when encoding "space." The output of this last polarity switch is used to double sideband modulate or phase shift key the carrier. In order to utilize the resulting signals, a receiver responsive to the carrier wave is employed together with a delay line similar to that in the transmitter, a sequence programmer like that in the transmitter and a correlator which function together to provide the desired "mark" and "space" output with which the transmitted signal was encoded.

The features of this invention which are believed to be novel are set forth with particularity in the appended claims. The invention itself, however, both as to its organization and its method of operation, together with further objects and advantages thereof, may best be understood by reference to the following description taken in connection with the accompanying drawings, in which:

Figure 1:
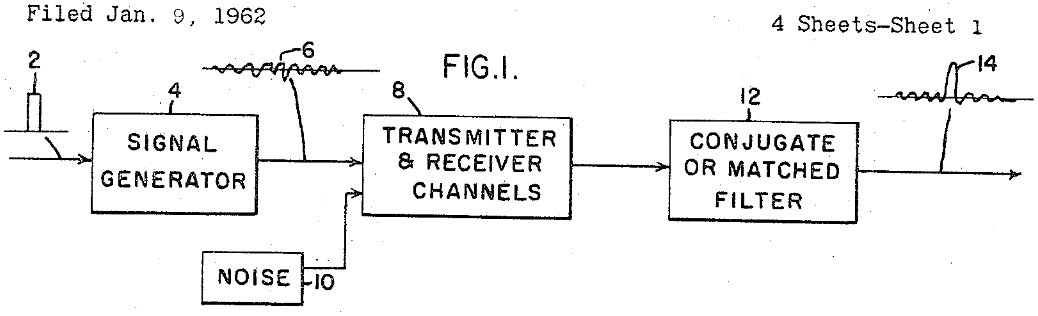
FIG. 1 is a block diagram illustrating a principle involved in the invention.

Turning first to FIG. 1, which is intended to illustrate a principle embodied in the invention, we find illustrated a pulse 2 which is supplied to a signal generator 4. The pulse 2, as indicated in the figure, is essentially a square pulse which is received by the signal generator 4, an embodiment of which is described in detail later in the specification. The signal generator 4 which may include a special filter produces an output signal 6 which looks like noise and has a much greater time duration than did the original pulse 2. The transmitter and receiver channels 8 may be conventional radio transmitting and receiving equipment which transmits the signals 6 from the generator 4 to a filter 12 which is conjugate to or matches the filter in the generator 4. Along the way, the signal 6 will be modified by noise 10 where the noise will be understood to include any noise generated in the equipment itself, but is primarily noise from outside the system whether the noise is from natural sources or is man-made. The conjugate or matched filter 12 is designed to be the counterpart of the filter in signal generator 4 and ideally will accept the "stretched" voltage 6 and provide at its output terminal a response relatively free of noise and with a large central peak as indicated at 14. Insofar as certain types of communications equipment is concerned, the peak 14 will be indistinguishable from the signal 2 and therefore a system of this type may be used to transmit information from one point to another while disguising it as noise.

If the noise 10 which is introduced into a system such as that indicated in FIG. 1 consists of white noise having a density $N_0$ watts per cycle, assuming single ended spectra, the peak-signal-to-RMS-noise voltage ratio at the instant of the peak will be:

$$\left(\frac{S}{N}\right)_{\text{volts}}=\sqrt{\frac{2E}{N_0}} \qquad (1)$$

where E is the total energy per pulse of the received signal wave-form. It can be shown that if timing is known accurately and it is possible to sample the receiver filter output at the instant of peak response, a matched filter such as is embodied in this invention will give identical results to those obtained by the elaborate combination of correlation and filtering techniques referred to in the introductory paragraphs, for given noise density and given energy per pulse. With the matched filter system of the present invention it is possible even to ignore the timing of the system and make decisions by setting a threshold level and by noting which of two receiver filters produces a peak output large enough to overcome this threshold. The two receiver filters may be substituted for the single conjugate or matched filter 12 so that one may be used for "mark" and a different one for "space." There are some performance penalties associated with this alternate mode of operation, of course, but at least there is a choice in the matched filter case where none is possible in the correlation techniques referred to above.

In order to enhance system security, the characteristic of the filter contained in the signal generator 4 and that of the conjugate filter 12 may be changed from time-to-time, or even from pulse-to-pulse. The change routine must be known at the receiver, but the timing problems are still not serious, since one need only make the filter change a bit in advance of the next received pulse.

Figure 2:
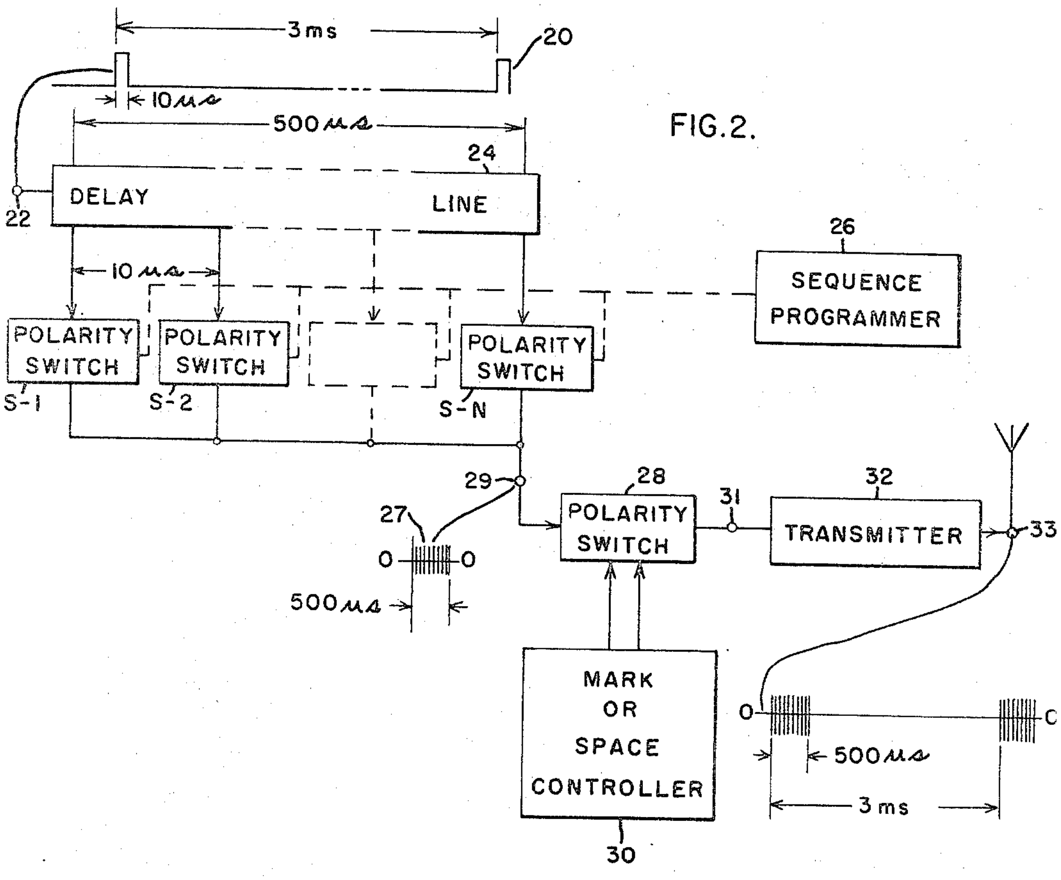
FIG. 2 is a block diagram illustrating the transmitting portion of an embodiment of the invention.
Figure 4:
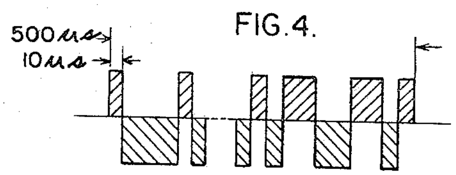
FIG. 4 is a diagram illustrating relationships between certain signals in the system.

Turning now to the signal generator and transmitter block diagram shown in FIG. 2 for further elaboration of the invention, we find at the upper left of the diagram a line 20 representing 10 microsecond pulses having a repetition period of three milliseconds. These 10 microsecond pulses are supplied at the terminal 22 of a delay line 24 which is tapped at 10 microsecond intervals for a total length of 500 microseconds. The 50 tap points are coupled through polarity switches S–1, S–2 . . . S–N, where N indicates the total number of tap points. This number N is 50 in the illustrated example, but it may be some other number if different timing of pulses, different lengths of delay line, different distance between taps on the delay line or other changes are made. The polarity switches S–1, S–2 . . . S–N are designed so that in response to a positive pulse from the delay line and selected signals from a sequence programmer 26 they will supply either a positive or a negative output pulse, depending on the signal from the sequencer. The sequence programmer 26 may be a manual programmer or sequencer which can determine the polarity of the output of each of the polarity switches, but in a preferred embodiment it will be an electronically controlled programmer which can change the polarity of the output of any or all of the polarity switches in order to enhance system security. The outputs of the polarity switches are combined to produce a 500 microsecond coded pulse made up of 50 ten microsecond pulses of mixed positive and negative polarity. This 500 microsecond coded pulse is indicated roughly at 27 as an input to the polarity switch 28 at terminal 29. Its repetition frequency will be 3 milliseconds. Parts of trains of pulses, such as may appear at terminal 27, are also shown in detail in FIG. 4, where 19 pulses from a train of fifty are shown and in FIG. 5(*b*), where 4 pulses are shown.

The coded pulses supplied at the polarity switch 28 have their polarity or phase controlled by binary input data from a "mark" or "space" controller 30. If a "mark" is to be sent, the polarity switch remains at its present state while each 500 microsecond train of pulses is transmitted. If a "space" is to be sent, the state of the polarity switch reverses for each 500 microsecond train of pulses transmitted. In this way, time adjacent coded pulse trains are encoded with binary data, since the "mark" and "space" signals, or signals to keep the phase or reverse it, can be considered to be a series of binary digit 1's and 0's, respectively. It will be recognized, of course, that the controller 30 may be set to control the phase of any part of the train of pulses or a group of pulses without varying the principle of operation of the present invention.

Figures 6, 7:
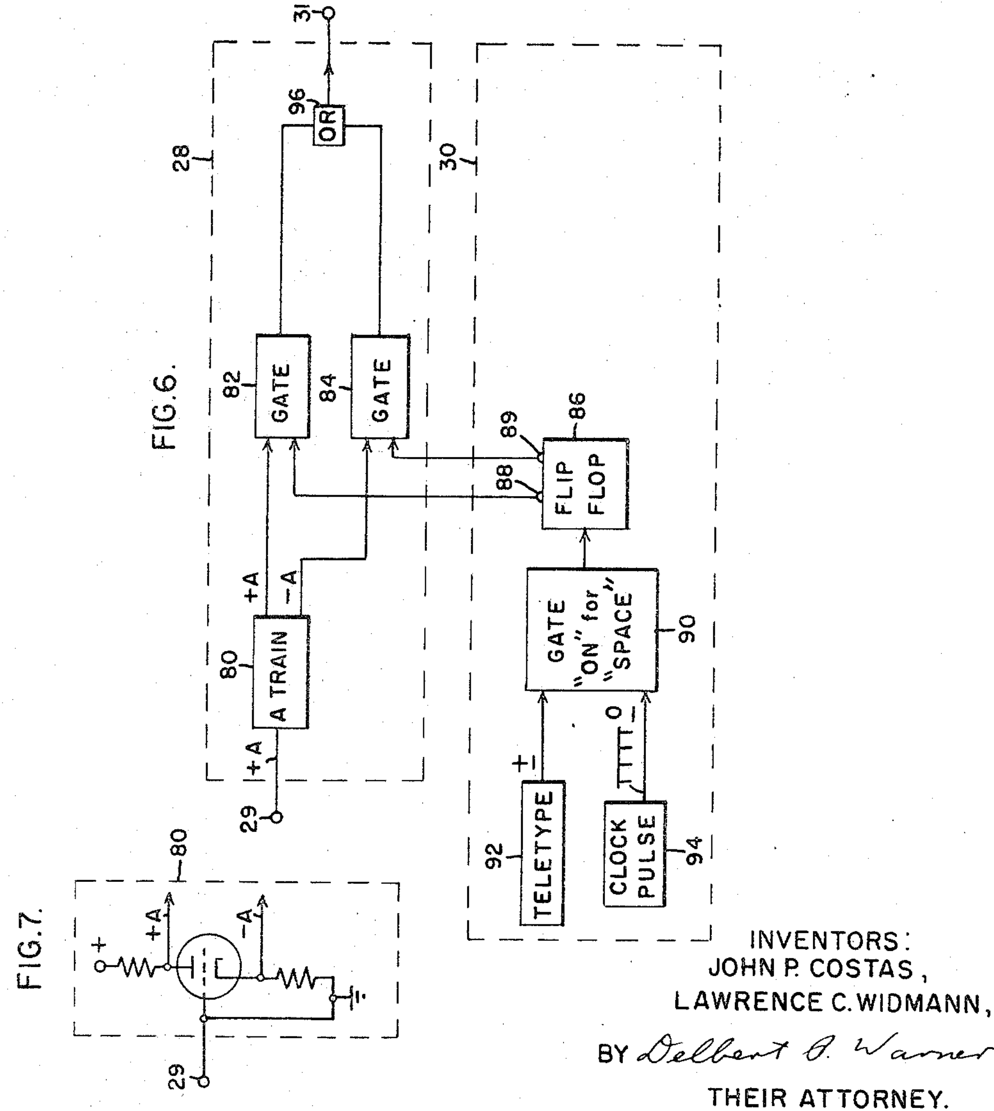
FIG. 6 is a block diagram illustrating the construction of the control circuits of use in the transmitter.
FIG. 7 is a schematic diagram showing a particular element used in the invention.

In FIG. 6 gate circuits 82 and 84 are under control of a flip-flop at 86 which may consist of a bi-stable multivibrator with two outputs at terminals 88 and 89. The two outputs provide one of two output voltage levels in opposition. If either gate 82 or gate 84 is opened by the lower of the two voltage levels which may appear on either 88 or 89, then only one of the two gates 82 or 84 will operate at one time. Each time a clock pulse enters flip-flop 86, the state of the flip-flop changes so that if the output of 88 were at the higher of the two levels and the output at 89 were at the lower of the two levels before the clock pulse entered flip-flop 86, then after the first clock pulse enters the flip-flop, the voltage levels on 88 and 89 would be interchanged. After the second pulse enters the flip-flop 86, the state of the flip-flop would revert to that present before the receipt of the first clock pulse. When gate 82 operates, pulse train +A is transmitted through gate 82, through OR circuit 96 and thus to the terminal 31. When gate 84 operates, pulse train −A is transmitted through gate 84, through OR gate 96 and thus to terminal 31. The gate 90 is controlled by the Teletype signals from 92, where a normal plus Teletype signal or "mark" will leave the gate 90 "off," but a negative signal or "space" will turn the gate "on" to transmit to flip-flop 86 one clock pulse from the clock pulse generator 94 each 3 milliseconds as long as the gate 90 is "on." In this way the "mark" or "space" controller 30 inverts the polarity of the pulse train leaving the polarity switch 28 each time a "space" is transmitted and leaves it unchanged when a "mark" is transmitted. In the circuitry following terminal 31, only the polarity of the individual 10 $\mu$s. pulses is significant, since these modulate the transmitter output.

The output of the polarity switch 28 may be used to modulate a transmitter such as a double sideband transmitter indicated by block 32 in FIG. 2. The modulation will, in a preferred embodiment, be by phase shift keying so that there is a 180° phase shift in the carrier each time the signal from 28 changes in polarity. As indicated in FIG. 2, the radiated signal will consist of radio frequency bursts which occur with a 3 milli-second repetition period and have a 500 microsecond burst duration. Each burst is in turn composed of a signal which may change polarity or phase by 180° at 10 microsecond intervals or at some other interval as determined by the sequence programmer 26 to produce a sequence such as is shown in part in FIG. 4. The RF signal transmitted contains no amplitude information during a burst, consequently conventional class −C amplifiers may be used for power amplification as with conventional AM, CW, or FM transmitters.

Figure 5:
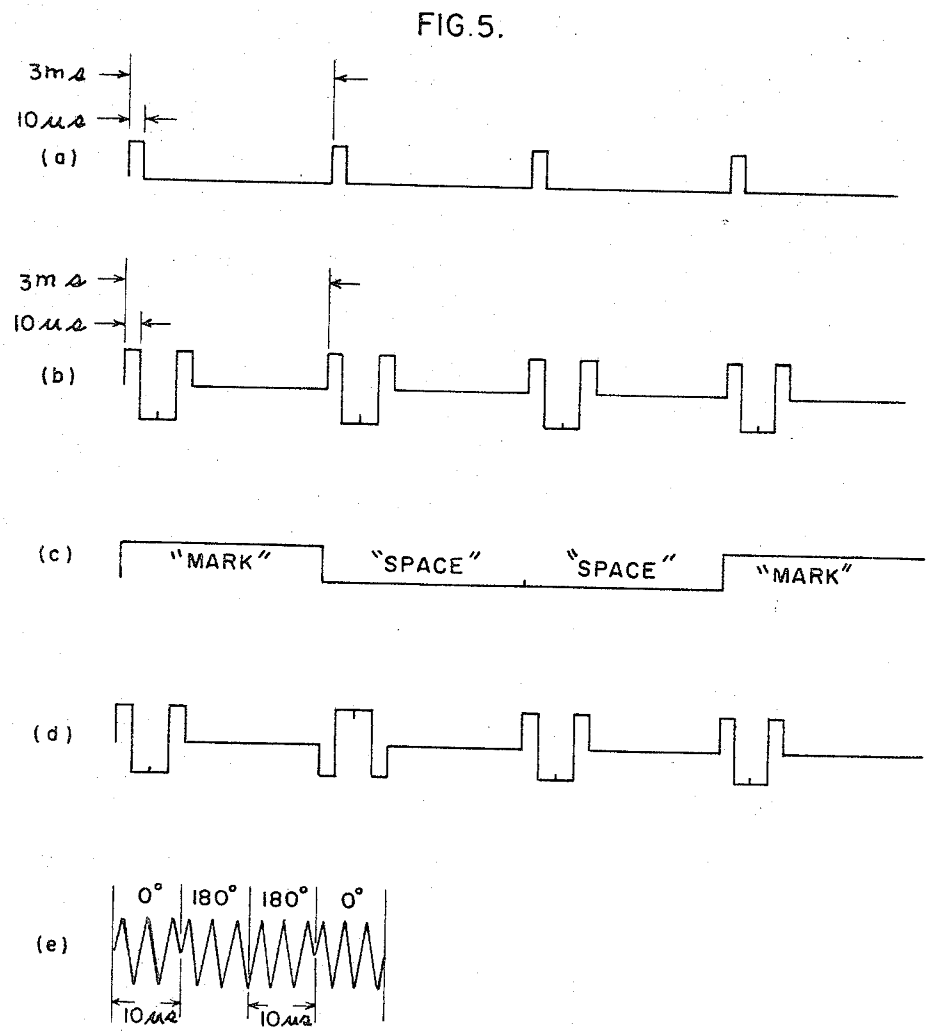
FIG. 5 is a diagram illustrating signal relationships in the transmitter.

Further clarification of the operation of the transmitter of FIG. 2 may be found by consideration of the diagrams in FIG. 5. We see at FIG. 5(*a*) a representation of a 10 microsecond pulse train having a repetition period of 3 milliseconds. This pulse train is supplied at the terminal 22 in FIG. 2 and from there to the delay line and polarity switches under control of the sequence programmer 26 to generate a new train of pulses at terminal 29. An exemplary block of pulses such as might be available at terminal 29 has been shown in FIG. 4 and a similar but more limited block of pulses are shown in FIG. 5(*b*). The pulses in FIG. 5(*b*) represent a plurality of groups of pulses separated by three milli-seconds such as might be expected to appear at terminal 29 if the sequence programmer remained unchanged for four 3 millisecond pulse periods, but it will be recognized that a change may be made in the sequence programmer at any time. A part of the diagram 5(*c*) which is labelled variously as "mark" and "space" looks very similar to a pulse train, but is intended merely to indicate the functioning of the polarity switch 28 and its attendant circuitry where "mark" will indicate that a pulse will be transmitted without polarity change and "space" will indicate that the pulse will be transmitted with a reversal of polarity or phase.

Considering FIG. 5(*d*) with 5(*b*), it is apparent that when a "mark" is being transmitted that the corresponding pulse train from terminal 29 of FIG. 2 will be transmitted with its polarity unchanged. In FIG. 5 this phenomenon is illustrated by the first and last groups of four pulses at (*d*) when considered with the "mark" signals of (*c*). But when "space" is sent there will be a reversal of phase from that of the *last* transmitted pulse train as indicated in FIG. 5 with the second and third groups of four pulses in (*b*) and (*d*). This last requirement that each "space" signal provide for phase shift from the last preceding pulse train is necessary in order that the phase modulated carrier wave will transmit the required intelligence signals. This reversal of phase will actually be determined by the operation of the flip-flop 86 of FIG. 6, which, as previously discussed, may be a bistable multivibrator. The nature of the output of transmitter 32 at terminal 33 is indicated at FIG. 5(*e*) where a number of jagged lines are used to indicate a carrier wave and a phase reversal is indicated at 10 microsecond intervals where there has been a corresponding change in polarity in the first plurality of four pulses illustrated in FIG. 5(*d*). It will be recognized that one additional 500 $\mu$sec. burst will be introduced when the transmitter is first turned on, since the encoding and decoding of the "mark"/"space" information necessitates a comparison of each 500 $\mu$s. pulse train with its predecessor.

Figure 3:
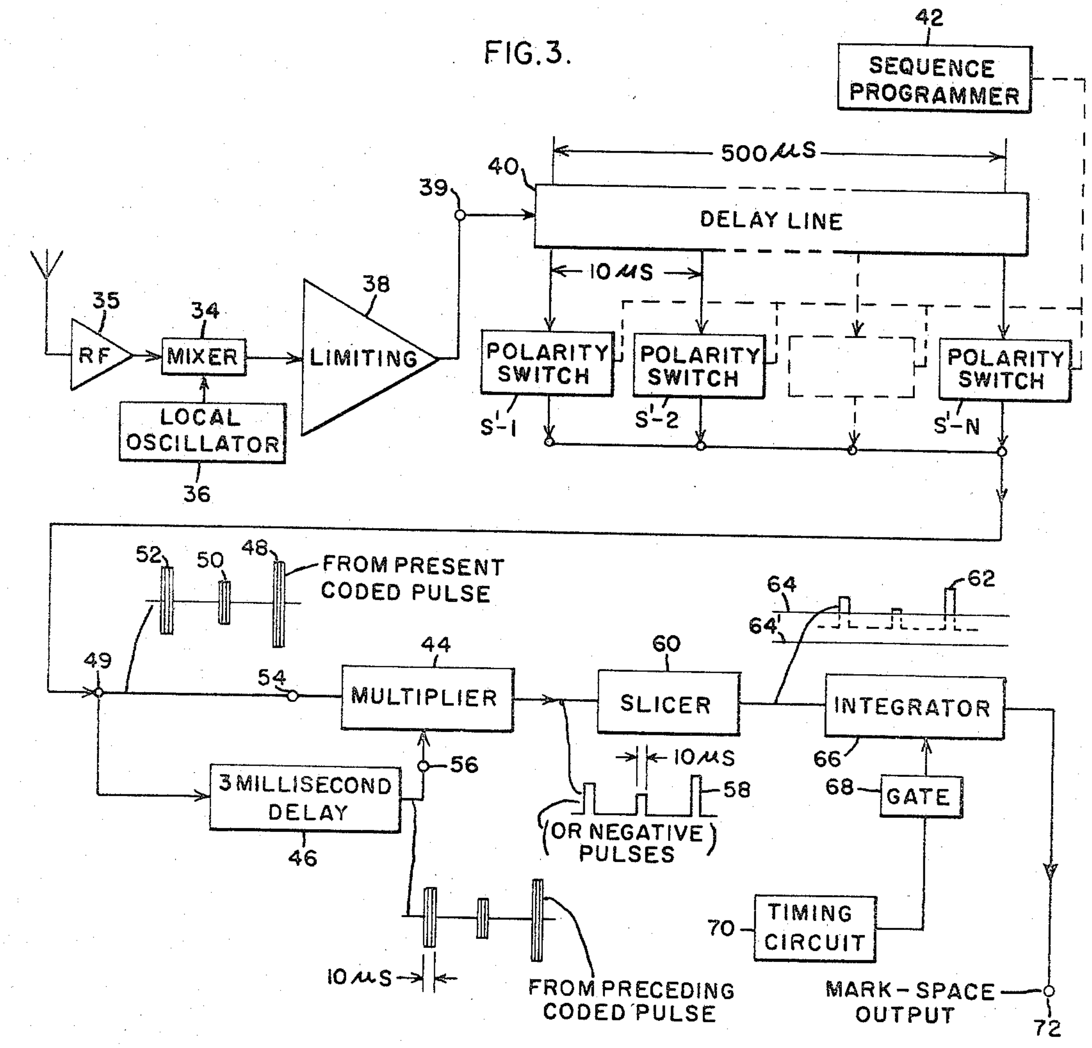
FIG. 3 is a block diagram illustrating the receiver portion of an embodiment of the invention.

A receiver block diagram for use with the present invention is illustrated in FIG. 3. A conventional superheterodyne receiver circuit may be used to receive the 500 microsecond pulses transmitted by the apparatus shown in FIG. 2. Such a circuit may embody an RF amplifier 35, a mixer 34 and a local oscillator 36 so that the output of the mixer 34 will be preferably an IF signal at 800 kilocycles composed of bursts of 50 pulses of 8 cycles duration each. Due to the constant-amplitude characteristic of the signal burst, analysis indicates that a penalty of less than 1 db will be incurred if hard limiting is employed in the receiver, with signal-to-white noise ratios less than 1 and in all practical systems this penalty will be small. A limiting amplifier 38 is therefore used at IF, since this helps considerably in controlling dynamic range problems at later points in the receiver. It will be appreciated that of the total power at IF only a rather small percentage, may represent desired signal power, depending upon the signal-to-noise ratio.

The output of the limiting amplifier 38 is supplied through terminal 39 to a tapped delay line 40 which is coupled to polarity switches S′–1, S′–2 . . . S′–N. The switches are set by the sequence programmer 42 in *reverse* order to the polarity switches S–1 through S–N of the transmitter delay line 24. This results in a matched or conjugate receiver filter for the transmitted coded pulse. When the coded signal fills the delay line 40, the output signal voltage after the summation of polarity switch outputs will be 50 times as large as the input signal voltage and the IF components will be of a polarity determined by the polarity of switch 28 in the transmitting circuit. This signal will represent the central peak of a matched filter response such as that from block 12 which was discussed in connection with FIG. 1, ignoring side responses for the moment. If the transmission of the carrier wave has been by a multiplicity of paths or more simply by multipath, the coded pulse will be received several times due to the different path delays and the matched filter system will give several output peaks as indicated at 48, 50, and 52.

Figure 8:
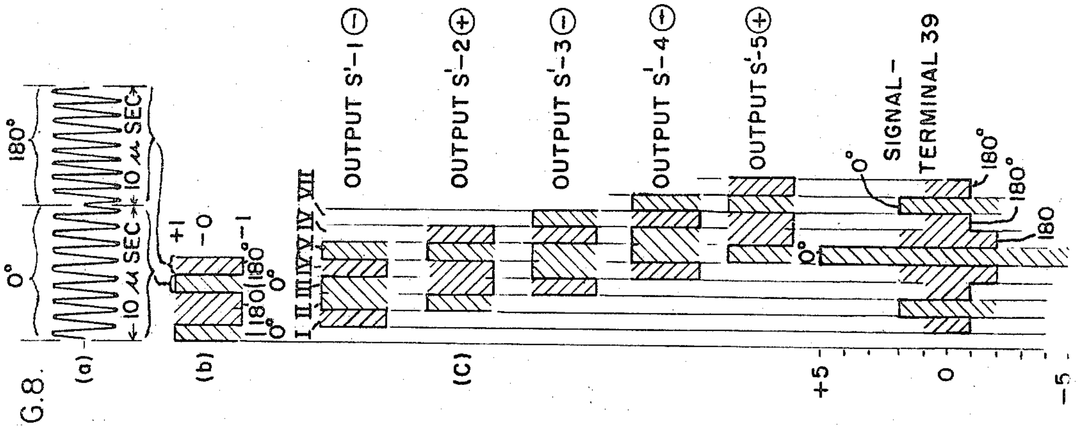
FIG. 8 is a diagram illustrating certain relationships between signals in the invention.

Turning now to FIG. 8 which will be useful in a further description of the operation of the receiver circuit of FIG. 3, it will be recalled that the signal supplied at terminal 39 in FIG. 3 is an IF signal of 800 kilocycles. The frequency and time relationships are such that each 10 microsecond pulse which was originally generated in the circuits of FIG. 1 and FIG. 2 would include exactly 8 of the 800 kilocycle IF waves. This is indicated in FIG. 8(*a*) where a 10 microsecond period has been expanded to show the inclusion of exactly 8 cycles. It will be noted that the first 10 microsecond pulse in FIG. 8(*a*) is designated as zero degrees (0°) and corresponds to a positive pulse in FIG. 8(*b*) and (*c*). The second pulse in FIG. 8(*a*) is designated as 180° and has been drawn to show the IF signal as being 180° out of phase with the corresponding IF signal in the first or zero degree (0°) pulse. A pulse of five units length is indicated at FIG. 8(*b*) where the five pulses are each 10 microseconds wide and correspond to pulses originally generated at FIG. 2. The hash lines in these pulses have been inserted to indicate the presence of the eight IF cycles. As indicated, the hash lines rising from the left to the right represent the zero degree (0°) phase. The hash lines starting at the upper left and going to the lower right designate pulses which are at the 180° phase. The +1 and −1 and 0 in FIG. 8(*b*) represent arbitrary standards for the amplitudes of the pulses and show that they would generally be of constant amplitude.

FIG. 8(*c*) illustrates five output pulse trains as they might appear at the output terminals of polarity switches S′–1 through S′–5, assuming tha tthe input pulses were the same as those indicated in FIG. 8(*b*). As was previously explained, the polarity switches in FIG. 3 have been set in reverse order to the polarity switches in FIG. 2 and it will be assumed for purposes of discussion of FIG. 8 that there are only five such polarity switches. The outputs of these five polarity switches will of course be determined by the polarity of the input pulses and whether or not the switches reverse the polarity of those input pulses. As indicated by the minus signs in FIG. 8(*c*) the switches S′–1, S′–3 and S′–4 reverse the polarity of their inputs. The plus signs indicate that switches S′–2 and S′–5 transmit pulses with the same polarity they had when received. The outputs of all the polarity switches are supplied at a common summing bus which terminates at terminal 49 of FIG. 3 to provide pulses such as 48, 50, and 52.

The exact way in which pulses 48, 50 and 52 are formed may be determined by consideration of FIG. 8(*c*). In this figure the pulses will be assumed to be moving from left to right so that the first pulse will reach the output of S′–1 first, the output of S′–2 second and so forth. Summing the outputs appearing on the output terminals of these switches we find in column I a single pulse of 180° phase so that the pulse of only one unit magnitude will be supplied at the output terminal 49 and it will be 180° phase. Summing the pulses in column II we find two pulses of 0° phase so that the output on terminal 49 during the next period will be a pulse two units high having 0° phase. Summing the pulses appearing in column III nets a single pulse having 180° polarity which will also be made available at terminal 49. During the fifth period, which corresponds to the time at which all five of the 10 microsecond pulses will be made available at the polarity switches, summation results in a pulse five units high and with zero degree (0°) polarity. It will be recalled that it was said that when the coded signal fifty units long filled the delay line 40 of FIG. 3 that the output signal voltage after the summation of polarity switch outputs would be 50 times as large as the input signal voltage. This was due to the fact that the polarity switches in FIG. 3 have been sequenced to remove the polarity reversals supplied by the delay line 24 in FIG. 2. In the example shown for the sake of simplicity in FIG. 8, only five pulses are involved and five polarity switches, so only five pulses are totaled when the five unit delay line is filled. The principle involved is the same as with 50 pulses and the result differs only in a quantitative sense.

In FIG. 3 the output of the receiver matched filter system is fed to a multiplier 44 and thru a 3 millisecond delay 46 to a second input terminal of the multiplier 44. The figure shows, at 48, 50 and 52, the expected multiplier input wave forms in the case of 3 dominant ionospheric paths. It should be noted that one multiplier input is supplied at terminal 54 from a presently received coded pulse, whereas the other multiplier input is supplied at terminal 56 as delayed input signal from the previously received coded pulse. The multiplier 44 and delay line 46 thus function as the first portion of a correlator circuit. The IF phases and amplitudes of each group of bursts at any one of the multiplier inputs are generally unrelated, since they have traversed different paths. However, a phase relationship between any two corresponding bursts of the undelayed and the delayed signal at the multiplier inputs definitely exists and will be zero degrees or will be 180 degrees depending on whether a "mark" or "space" has just been received.

The multiplier circuit produces a positive or "mark" pulse if a zero degree (0°) relationship exists between the two signals entering the multiplier 44. A minus or "space" pulse is produced if a 180° relationship exists between the two signals entering the multiplier 44.

Two assumptions are made in the foregoing. The first is the multipath spread will be less than the 3 millisecond coded pulse repetition period and the second is that the individual path phase stability over a 3 millisecond period will be high. Both of these assumptions appear to be justified especially in view of the fact that the time element favors both of them. In the case of multipath, a time of 3 milliseconds will be enough to include signals going over any reasonable variation of path length and signals traveling much longer paths would be so attenuated as to be negligible strength. It does not seem likely that these signals would undergo a significant phase shift in a 3 millisecond period under the conditions which are expected to prevail. Experiments confirm that these assumptions are valid.

The video portion of the output of the multiplier 44 will be a series of positive or negative 10 microsecond pulses depending upon whether "mark" or "space" has been transmitted. A "mark" signal is indicated at 58 of FIG. 3 and it will be sent to a slicer 60 which will pass only that portion of the signal which exceeds a certain preset threshold level. If a negative or "space" signal is transmitted the slicer 60 will pass only a signal beyond a certain negative level. The output of the slicer will be indicated as a plurality of pulses like 62 which rise above the threshold level indicated by the line 64, or they may be negative pulses below the line 64' in case the pulses at 58 are negative. The slicer output is integrated by the integrator 66 for a 3 millisecond period of time determined by the gate 68 in response to timing signals from a timing circuit at 70. At the end of each integration period a "mark" or "space" decision will be made on the basis of integrator output voltage polarity and supplied at the terminal 72.

What we claim as new and desire to secure by Letters Patent of the United States is:

1. A secure communications system comprising means for receiving a plurality of pulses of short duration and converting each of them to a train of precisely determined positive and negative pulses of long duration, means for encoding said trains of pulses with a message in binary form to generate an encoded signal, said means for encoding comprising means for relaying said pulses with unchanged polarity to indicate a first binary state and for relaying said pulses with their polarities reversed to indicate the other binary state, means for transmitting said encoded signal, means for receiving said encoded signal, and means for converting said encoded signal to a new plurality of pulses from which said original trains of pulses have been removed leaving only said message.

2. A secure communications system comprising means for receiving a plurality of pulses of short duration and converting each of them into a train of precisely determined positive and negative pulses of long duration, means for encoding said trains of pulses with a message, said means for encoding including a polarity switch for reversing the polarity of said trains of pulses to indicate "space" and leaving them with unchanged polarity to indicate "mark," means for transmitting said trains of encoded pulses, means for receiving said trains of encoded pulses, and means for converting all the original precisely determined positive and negative pulses to reconstruct the original pulses of short duration to provide a new pulse train consisting of positive and negative pulses which compose the message.

3. A communications system comprising means for receiving a train of positive pulses, first sequencing means for changing each pulse of said train of positive pulses to a train of mixed positive and negative pulses having a desired sequence, controller means for encoding each of said trains of mixed positive and negative pulses by controlling the polarity of each of said trains of pulses according to binary information, said trains of pulses being passed with unchanged polarity to represent one kind of binary signal and with reversed polarity to represent the other kind of binary signal, means for transmitting said trains of encoded pulses, means for receiving said trains of encoded pulses, means including a second sequencing means to reverse the effect of the first sequencing means and supply a new train of pulses free of the effect of the sequencing means and coded only in accordance with said binary information.

4. A matched filter communications system comprising first filter means for receiving pulses and converting each of them to a series of noise-like signals having durations much greater than said pulses; a polarity switch, controlled by binary data, for receiving each of said series of noise-like signals and converting selected ones to a new series of noise-like signals of reversed polarity representing one state of said binary data and transmitting other series unchanged to represent another state of binary data; means for using said new transmitted series of noise-like signals to phase-shift modulate a selected carrier wave; means for transmitting said modulated carrier wave; receiver means for accepting said modulated carrier wave, mixing it to provide an IF signal, and transmitting said IF signal to second filter means for conversion into new pulses incorporating said binary data and independent of said noise-like signals; and a correlator, for correlating said new pulses, incorporating a delay line and a slicer and an integrator to provide mark and space output signals in accordance with said original binary data.

5. A matched filter communications system comprising first filter means for receiving pulses separated by a relatively long time period and converting them to a series of noise-like signals having durations much longer than said pulses but less than said long time period; a polarity switch, controlled by binary data representing "mark" and "space," for receiving said series of noise-like signals and reversing the polarity of selected ones of said series to form a new series of noise-like signals of a polarity adjusted to include a representation of said binary data; means for using said new series of noise-like signals to phase-shift key modulate a selector carrier wave; means for transmitting said modulated carrier wave; receiver means for accepting said modulated carrier wave, mixing it to provide an IF signal, and transmitting said IF signal to second filter means for conversion into new pulses incorporating said binary data and independent of said noise-like signals; and a correlator, for correlating said just received new pulses with corresponding new pulses received in the preceding long time period, said correlator incorporating a delay line and a slicer and an integrator to provide mark and space output signals proportional to said original binary data.

6. A communications system comprising means for receiving a train of positive pulses, first sequencing means for changing each pulse of said train of positive pulses to a train of mixed positive and negative pulses having a desired sequence, controller means for encoding each of said trains of mixed positive and negative pulses by selectively changing the polarity of selected trains of pulses according to binary information, said trains of pulses being passed with unchanged polarity to represent one kind of binary signal and with reversed polarity to represent the other kind of binary signal, means for transmitting said trains of encoded pulses, means for receiving said trains of encoded pulses, means including a second sequencing means to reverse the effect of the first sequencing means and supply a new train of pulses free of the effect of the sequencing means and coded only in accordance with said binary information.

7. A secure communications system comprising means for receiving a train of positive pulses, first sequencing means for changing each of said positive pulses to a train of mixed and negative pulses having a desired sequence, controller means for encoding said trains of pulses by selectively changing the polarity of selected trains of mixed positive and negative pulses according to binary information, means for transmitting said trains of encoded pulses via phase shift keying; means for receiving the signal resulting from phase shift keying, and means including a second sequencing means to reverse the effect of the first sequencing means and supply a train of pulses free of the effect of the sequencing means and coded only in accordance with said binary information.

8. A secure communications system comprising means for receiving a train of positive pulses, first sequencing means for changing each of said trains of positive pulses to a train of mixed positive and negative pulses having a desired sequence, controller means for encoding said trains of mixed positive and negative pulses by controlling the polarity of each of said trains of mixed positive and negative pulses according to binary information, means for phase shift key modulating a transmitter with said trains of encoded pulses to generate a new signal, said transmitter transmitting said new signal, means for receiving said new signal, means including a second sequencing means to reverse the effect of the first sequencing means and supply a new train of pulses free of the effect of the sequencing means and coded only in accordance with said binary information, and correlator means for multiplying and integrating pulses from said present train of pulses and from a preceding train of pulses to provide improved mark-space signals in the presence of multi-path phenomena.

9. In a matched filter communications system a first filter coupled to switching means for generating bursts of pulses separated by fixed time periods, each burst consisting of a precisely controlled sequence of contiguous positive and negative pulses; means for encoding each of said bursts of pulses with signals by transmitting selected bursts of pulses unchanged to represent "mark" and by reversing the polarities of each of the constituent pulses of other bursts to represent "space"; means using the resulting encoded signals to modulate a carrier wave by phase shift keying; means for transmitting said carrier wave; means for receiving said carrier wave and generating an IF signal; a second filter matching the first filter for receiving said IF signal, changing the phase relationship of the IF pulses in each burst to either all one phase or all another depending upon whether "mark" or "space" was transmitted; and means for treating the resulting pulses to derive the original encoded signals.

10. In a matched filter communications system a first filter coupled to switching means for generating bursts of pulses separated by fixed time periods, each burst consisting of a precisely controlled sequence of contiguous and negative pulses; means for encoding said bursts of pulses with signals by transmitting selected bursts unchanged to represent "mark" and by reversing the polarities of each of the constituent pulses of other bursts to represent "space"; means using the resulting encoded signals to modulate a carrier wave by phase shift keying; means for transmitting said carrier wave; means for receiving said carrier wave and generating an IF signal; a second filter matching the first filter for receiving said IF signal, changing the phase relationships of the IF pulses in each burst to either all one phase or all another phase depending upon whether "mark" or "space" was transmitted; and means for treating the resulting pulses to derive the original encoded signals including a correlator incorporating a delay line and a slicer and an integrator to provide "mark" and "space" outputs in accordance with said original encoding signals.

11. A matched filter communications system comprising first filter means for receiving pulses separated by a relatively long time period and converting them to groups of noise-like signals having durations much greater than said pulses but less than said long time period; a polarity switch, controlled by binary data, for receiving and transmitting said groups of noise-like signals while reversing the polarity of selected groups to form a series of noise-like signals carrying said binary data; means for using said new series of noise-like signals to phase-shift key modulate a selected carrier wave; means for transmitting said modulated carrier wave; receiver means for accepting said modulated carrier wave, mixing it to provide an IF signal, and transmitting said IF signal to second filter means for conversion into new pulses incorporating said binary data and independent of said noise-like signals; and a correlator, for correlating said just received new pulses with corresponding new pulses received in the preceding long time period, incorporating a delay line and a slicer and an integrator to provide mark and space output signals proportional to said original binary data.

12. A matched filter communications system comprising first filter means for generating a series of noise-like signals made up of contiguous positive and negative pulses, groups of said signals being spaced apart by periods which are long compared with individual pulse lengths; a polarity switch, controlled by binary data, for receiving said groups of signals and converting them to a new series of noise-like signals by changing the polarities of selected groups of signals to incorporate said binary data; means for using said new series of noise-like signals to phase-shift key modulate a selected carrier wave by shifting the carrier in phase each time the noise-like signal experiences a phase shift; means for transmitting said modulated carrier wave; receiver means for accepting said modulated carrier wave, mixing it to provide an IF signal, and transmitting said IF signal to second filter means for conversion into new pulses incorporating said binary data and independent of said noise-like signals; and means for processing said new pulses to provide mark and space output signals in accordance with said original binary data.

13. A matched filter communications system comprising first filter means for generating a series of noise-like signals made up of groups of contiguous positive and negative pulses, said groups of signals being spaced apart by periods which are long compared with individual pulse lengths; a polarity switch, controlled by binary data, for receiving said groups of signals and converting them to a new series of noise-like signals by changing the polarities of selected groups of said signals to incorporate said binary data; means for using said new series of noise-like signals to phase-shift key modulate a selected carrier wave by shifting the carrier in phase each time the noise-like signal experiences a phase shift; means for transmitting said modulated carrier wave; receiver means for accepting said modulated carrier wave, mixing it to provide an IF signal, and transmitting said IF signal to second filter means for conversion into new pulses incorporating said binary data and independent of said noise-like signals; and a correlator, for correlating said just received new pulses with corresponding new pulses received in the preceding long time period, incorporating a delay line and a slicer and an integrator to provide mark and space output signals in accordance with said original binary data.

14. A matched filter communications system comprising first means for receiving a pulse and converting it to a noise-like signal made up of a programmed train of positive and negative pulses with each pulse having a duration substantially equal to said received pulse; a polarity switch, controlled by binary data, for receiving said noise-like signal and encoding it with binary data by forming a second train of pulses with polarity unchanged to represent one binary state or with the polarity of each individual pulse reversed to represent the other binary state; means for accepting said second train of pulses and modulating a selected carrier wave therewith; receiver means for accepting said carrier wave, mixing it to provide an IF signal and transmitting said IF signal to means similar to said first means for conversion of the pulse train contained in said IF signal into a third train of pulses independent of said noise-like signal; and a correlator for correlating said third train of pulses with a like train of earlier received pulses, said correlator incorporating a delay line and a slicer and an integrator to provide a pulse having a polarity determined in accordance with said original binary data.

15. A matched filter communications system comprising first means including a delay line and a plurality of polarity switches for receiving pulses and converting each of them to a noise-like signal made up of a programmed train of positive and negative pulses with each pulse having a duration substantially equal to said received pulses; a separate polarity switch, controlled by binary data, for receiving said noise-like signals and encoding each of them with binary data to form a second train of pulses with polarity unchanged to represent one binary state and with the polarity of each individual pulse reversed to represent the other binary state; means for accepting said second train of pulses, phase-shift modulating a selected carrier wave therewith and transmitting the resulting carrier signal; receiver means for accepting said carrier signal, mixing it to provide an IF signal and transmitting said IF signal to means similar to said first means for conversion of the pulse train in said IF signal into a third train of pulses independent of said noise-like signal; and a correlator for correlating said third train of pulses with a like train of earlier received pulses, said correlator incorporating a delay line and a slicer and an integrator to provide mark and space output signals in accordance with said original binary data.

16. A matched filter communications system comprising first filter means for receiving a plurality of pulses having a constant long time period and converting each of them to a noise-like signal made up of a programmed train of positive and negative pulses with each pulse having a duration substantially equal to said received pulse and each train of pulses having spacing from the preceding train by said constant long time period; a polarity switch, controlled by binary data, for receiving said noise-like signals and encoding each of them with binary data to form a second train of pulses, said polarity switch forming said second train of pulses by changing the polarity of each pulse in selected ones of said noise-like signals to represent one binary state and by passing the noise-like signals unchanged to represent the other binary state; means for accepting said second train of pulses, modulating a selected carrier wave therewith and transmitting the resulting carrier signal; receiver means for accepting said carrier signal, mixing it to provide an IF signal and transmitting said IF signal to filter means similar to said first filter means for conversion of the pulse train in said IF signal into a third train of pulses independent of said noise-like signal; and a correlator for correlating said third train of pulses with a like train of pulses received during the preceding long time period, to provide mark and space output signals in accordance with said original binary data.

17. A transmission system comprising means for receiving a pulse of short duration and converting it to a signal consisting of a plurality of precisely determined positive and negative pulses spread out over a long duration, said plurality of pulses having the appearance of random noise, means for converting said plurality of pulses to an intelligence bearing signal by passing them unchanged to indicate one binary state or with a reversal of polarity to indicate the other binary state, means for transmitting said intelligence bearing signal, means for receiving said transmitted intelligence bearing signal, and means for converting all the positive and negative pulses in said intelligence bearing signal to a single pulse corresponding to said pulse of short duration but with polarity determined in accordance with the transmitted intelligence.

18. A transmission system comprising means including a first delay line for receiving a pulse of short duration and converting it to a signal consisting of a plurality of precisely determined positive and negative pulses spread out over a long duration, said plurality of pulses having the appearance of random noise, means for converting said plurality of pulses to an encoded signal so that they carry intelligence by passing them with one polarity to indicate "mark" or with the opposite polarity to indicate "space," means for transmitting said encoded signal, means for receiving said encoded signal, and means including a second delay line conjugate to the first for converting all the originally determined positive and negative pulses to a single pulse to indicate either "mark" or "space."

19. A communications system comprising means for receiving a pulse of short duration and converting it to a first signal consisting of plurality of precisely determined positive and negative pulses spread out over a long duration, means including polarity reversing devices for encoding said first signal with a message, means for transmitting said encoded signal, means for receiving said encoded signal, means for converting said encoded signal from a plurality of pulses to a single pulse of a polarity determined by said polarity reversing device.

References Cited

UNITED STATES PATENTS

| | | | |
|---|---|---|---|
| 2,175,847 | 10/1939 | Mathes | 178—22 |
| 2,935,604 | 5/1960 | Di Toro | 325—44 |
| 2,982,852 | 5/1961 | Fano | 325—44 |

JOHN W. CALDWELL, *Acting Primary Examiner.*

RODNEY D. BENNETT, KATHLEEN H. CLAFFY, *Examiners.*

D. C. KAUFMAN, W. S. FROMMER, *Assistant Examiners.*

UNITED STATES PATENT OFFICE

CERTIFICATE OF CORRECTION

Patent No. 3,337,803 August 22, 1967

John P. Costas et al.

It is hereby certified that error appears in the above numbered patent requiring correction and that the said Letters Patent should read as corrected below.

Column 8, line 49, strike out "new"; column 9, line 29, after "mixed" insert -- positive --; column 10, line 8, before "and" insert -- positive --.

Signed and sealed this 23rd day of July 1968.

(SEAL)
Attest:

Edward M. Fletcher, Jr.
Attesting Officer

EDWARD J. BRENNER
Commissioner of Patents